US006803733B1

(12) United States Patent
Shabana et al.

(10) Patent No.: US 6,803,733 B1

(45) Date of Patent: Oct. 12, 2004

(54) PILLAR-MOUNTED POWER DOOR LOCK AND POWER WINDOW SYSTEM FOR A VEHICLE

(75) Inventors: Mohsen D. Shabana, Ann Arbor, MI (US); Robert Louis Vitale, Macomb Township, MI (US); Philip Walter Leistra, deceased Late of Waterford, MI (US), by Nancy Leistra, legal representative

(73) Assignee: General Motors Corporation, Detroit, MI (US)

( * ) Notice: Subject to any disclaimer, the term of this patent is extended or adjusted under 35 U.S.C. 154(b) by 9 days.

(21) Appl. No.: 10/409,644

(22) Filed: Apr. 8, 2003

(51) Int. Cl.[7] .............................. H02P 1/22; B60J 5/06

(52) U.S. Cl. ....................... 318/280; 318/283; 318/284; 318/445; 318/466; 296/202; 296/146.6; 296/146.11; 296/146.12; 296/155; 49/358; 49/362; 49/139; 49/210; 49/360

(58) Field of Search ................................ 318/280–294, 318/446–466; 296/146.11, 146.12, 155; 49/280, 360, 139, 358, 362

(56) References Cited

U.S. PATENT DOCUMENTS

| | | | | | |
|---|---|---|---|---|---|
| 4,186,524 | A | | 2/1980 | Pelchat | 49/324 |
| 4,848,031 | A | * | 7/1989 | Yamagishi et al. | 49/280 |
| 4,901,474 | A | * | 2/1990 | Bayard et al. | 49/26 |
| 5,155,937 | A | * | 10/1992 | Yamagishi et al. | 49/280 |
| 5,203,112 | A | * | 4/1993 | Yamagishi et al. | 49/280 |
| 5,456,516 | A | | 10/1995 | Alexander et al. | 296/146.14 |
| 5,715,713 | A | | 2/1998 | Aubry et al. | 70/277 |
| 5,979,114 | A | * | 11/1999 | Clark et al. | 49/360 |
| 6,045,168 | A | | 4/2000 | Johnson et al. | 292/216 |
| 6,079,767 | A | * | 6/2000 | Faubert et al. | 296/155 |
| 6,125,583 | A | * | 10/2000 | Murray et al. | 49/291 |
| 6,234,565 | B1 | * | 5/2001 | Bryant et al. | 296/155 |
| 6,305,737 | B1 | * | 10/2001 | Corder et al. | 298/146.11 |
| 6,321,488 | B1 | * | 11/2001 | Bigoszewski et al. | 49/358 |
| 2003/0160476 | A1 | * | 8/2003 | Moriyama | 296/202 |

* cited by examiner

*Primary Examiner*—Paul Ip

(74) *Attorney, Agent, or Firm*—Laura C. Hargitt

(57) ABSTRACT

A vehicle power window and power door lock system includes a vehicle pillar adapted for use between openable and closable vehicle doors and a single lock actuation assembly in the pillar adapted for engagement with a front door lock latch assembly on a front door and a rear door lock latch assembly on a rear door for locking and unlocking the doors. The vehicle power window and power door lock system further includes a single reversible electric motor in the pillar adapted for selective engagement with a front window on an adjacent front door and a rear window on an adjacent rear door for driving the windows up and down. A vehicle side door assembly includes a door lock latch assembly, a latch rod operatively connected to the latch assembly, a window, and a driven gear operatively connected to the window. The latch rod is operably connectable to a lock actuation assembly located in a body pillar adjacent to the door when the door is positioned against the body pillar. The driven gear is operably connectable to a motor located in the body pillar.

20 Claims, 4 Drawing Sheets

PILLAR-MOUNTED POWER DOOR LOCK AND POWER WINDOW SYSTEM FOR A VEHICLE

TECHNICAL FIELD

This invention relates to a power door lock and power door window system for a vehicle.

BACKGROUND OF THE INVENTION

Typically, on vehicles that have power door locks, a separate actuating mechanism, which may be a solenoid, is employed for locking and unlocking each door. The solenoid is typically mounted in each door, adjacent to the door latch assembly on the door. Accordingly, four solenoids are typically necessary in a power lock system for a four-door vehicle. Similarly, a separate powering mechanism, usually a motor, is typically used to raise and lower each window in a vehicle that has a power window system. A motor is conventionally mounted within each vehicle door for powering the window mounted within the door. Accordingly, four separate motors are typically employed in a power window system on a four-door vehicle.

SUMMARY OF THE INVENTION

A vehicle pillar adapted for use between openable and closable vehicle doors having functional parts therein includes a structural member defining a hollow vehicle support portion adapted to abut the vehicle doors, and an actuating mechanism housed within the hollow vehicle support portion and including a drive member sufficiently engageable with a functional part of a respective vehicle door when the door is closed and the vehicle pillar is between the doors, so that the functional part functions. The functional part may be in a vehicle door lock system that locks and unlocks the doors. The functional part may be in a vehicle window system that opens and closes windows.

A vehicle power window and power door lock system includes a single lock actuation assembly adapted for engagement with a front door lock latch assembly on a front door and a rear door lock latch assembly on a rear door for locking and unlocking the doors. The vehicle power window and power door lock system further includes a single reversible electric motor adapted for selective engagement with a front window on the front door and a rear window on the rear door for driving the windows up and down. In the vehicle power window and power door lock system, the lock actuation assembly and the motor are mounted in a body pillar disposed between the front and rear doors.

In the vehicle power window and power door lock system, preferably the lock actuation assembly includes a dual action solenoid. Additionally, the lock actuation assembly preferably includes a front door engagement member and a rear door engagement member, each of which are disposed in the body pillar in a manner allowing for operable connection of the members with the respective door latch assemblies.

In the vehicle power window and power door lock system, preferably, the motor is selectively engageable with the front window when the front door is closed and with the rear window when the rear door is closed. Additionally, the vehicle power window and power door lock system preferably includes a front window drive gear, and a rear window drive gear, both of which are driven by the motor and are disposed in the body pillar in a manner allowing for operable connection of the drive gears with the respective windows.

A vehicle side door assembly includes a door lock latch assembly, a latch rod operatively connected to the latch assembly, a window, and a driven gear operatively connected to the window. The latch rod is operably connectable to a lock actuation assembly located in a body pillar adjacent to the door when the door is positioned against the body pillar. The driven gear is operably connectable to a motor located in the body pillar when the door is positioned against the body pillar.

The above objects, features and advantages, and other objects, features and advantages of the present invention are readily apparent from the following detailed description of the best modes for carrying out the invention when taken in conjunction with the accompanying drawings.

DESCRIPTION OF THE PREFERRED EMBODIMENTS

Vehicle Power Door Lock System

Figure 1A:
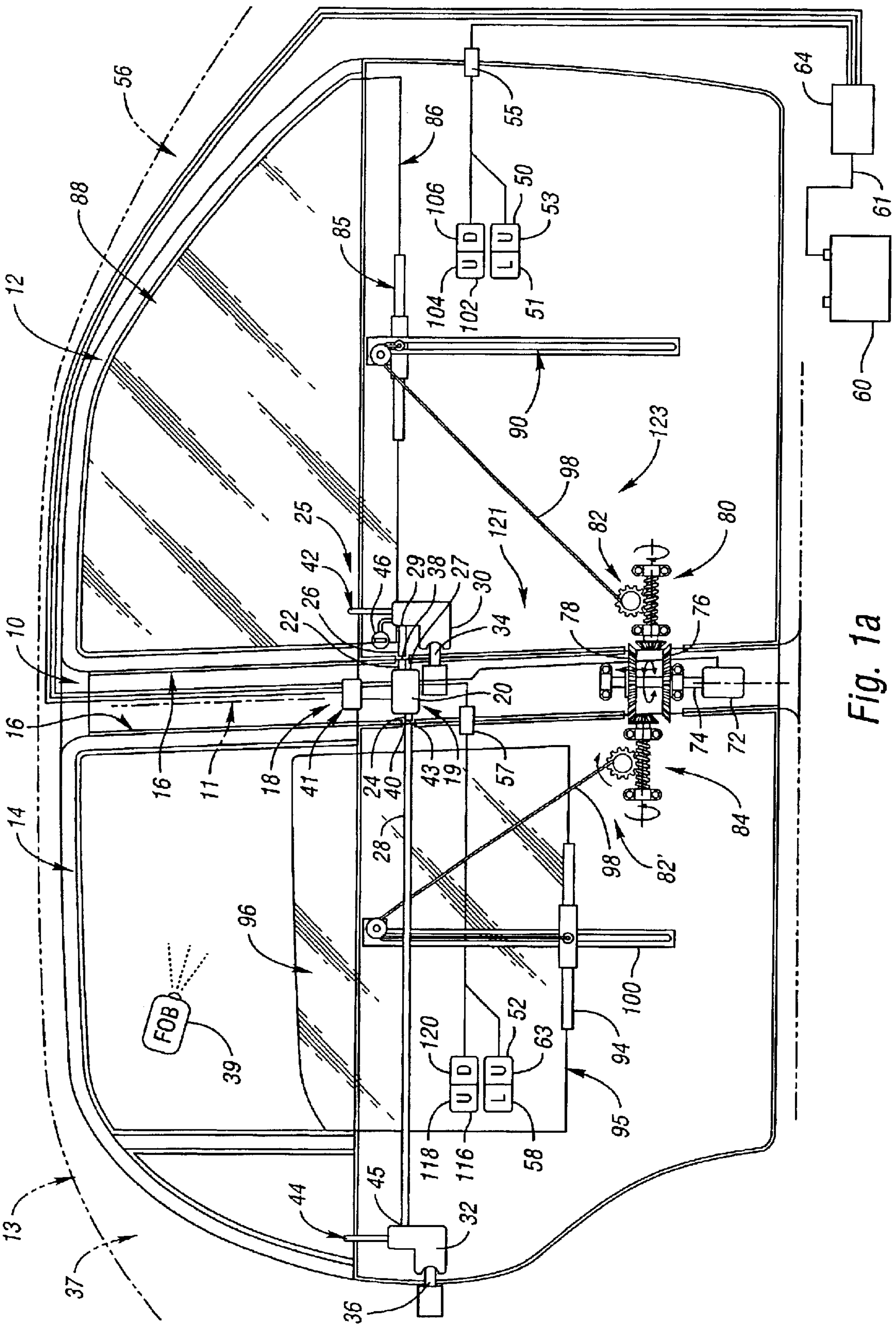
FIG. 1*a* is a fragmentary side schematic illustration of a vehicle having a power door lock system and a power window system according to an embodiment of the invention.

FIG. 1*a* shows the vehicle support pillar 10 disposed in a vehicle 13, including a structural member 16 and having a hollow support portion 18. The structural member 16 defines the hollow support portion 18 and is adapted to abut flanking vehicle doors, a front door 12 and a rear door 14. Pillar 10, also referred to as a body pillar, is commonly known as the B pillar. A single lock actuation assembly 19 which includes a first lock actuating mechanism 20, also referred to as a dual action solenoid, is housed within the hollow support portion 18 of the vehicle support pillar 10. The dual action solenoid 20 includes a first solenoid drive member 22, also referred to as a front door engagement member or a front door pin, and a second solenoid drive member 24, also referred to as a rear door engagement member or a rear door pin. The first and second solenoid drive members 22, 24 are also referred to as a front door engagement member and a rear door engagement member, respectively.

The front door pin 22 is engagable with a front door lock system functional part 26, located within the front door 12 and also referred to as a front door latch rod, when the front door 12 is positioned against the B pillar 10. Similarly, the rear door pin 24 is engagable with a rear door lock system functional part 28, located within the rear door 14 and also referred to as a rear door latch rod, when the rear door 14 is positioned against the B pillar 10. The front door latch rod 26 and the rear door latch rod 28 are part of a vehicle power door lock system 25 that locks and unlocks the doors 12, 14. When the doors 12, 14 are closed, power to the solenoid 20 causes the solenoid 20 to actuate the front door pin 22 and the rear door pin 24, driving them in opposite directions away from a centerline 11 of the B pillar 10. The front door pin 22 has a distal end 38 and the rear door pin has a distal end 40. When actuated, the distal ends 38, 40 strike the front door latch rod 26 and the rear door latch rod 28, respectively. The movement of the front door pin 22 and the rear door pin 24 is in a substantially horizontal direction. The front door latch rod 26 has a front door latch rod end 27 disposed adjacent to the front door pin 22 and another front door latch rod end 29 disposed adjacent to a front door lock latch assembly 30. The rear door latch rod 28 has a rear door latch rod end 43 disposed adjacent to the rear door pin 24 and another rear door latch rod end 45 disposed adjacent to a rear door lock latch assembly 32. Thus, the front door latch rod 26 is operably connectable to the distal end 38 of the front door pin 22 at one end 27 and is operatively connected to a front door lock latch assembly 30 at the other end 29.

Referring to FIG. 1*a*, power to the solenoid 20 causes the front door pin 22 to strike the front door latch rod 26, which toggles the front door lock latch assembly 30 by moving it from an unlocked position (if it was previously in a locked position) or to a locked position (if it was previously in an unlocked position). Those skilled in the art will recognize a variety of ways to accomplish this toggle within the latch assembly 30. When locked, the front door lock latch assembly 30 is engaged with a front door striker 34 which is mounted on the structural member 16 of the vehicle support pillar 10. When unlocked, the front door lock latch assembly 30 is disengaged from the striker 34. Successive power to the solenoid 20 will cause the front door pin 22 to strike the front door latch rod 26 again, thus toggling the front door lock latch assembly 30 to the opposite position.

Figure 1B:
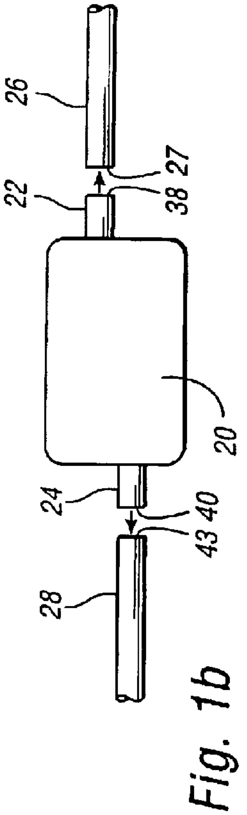
FIG. 1*b* is an enlarged side schematic illustration of a lock actuation assembly engageable with functional parts of flanking vehicle doors, as depicted in FIG. 1*a;*

Similarly, when the solenoid 20 is powered, the distal end 40 of the rear door pin 24 strikes the rear door latch rod 28 at one end 43. The rear door latch rod 28 is operably connectable with the rear door pin 24 at one end 43 and is operatively connected to the rear door lock latch assembly 32 at the other end 45. Referring to FIG. 1*b*, wherein like reference numbers refer to like components in FIG. 1*a*, a larger view of the solenoid 20, the front and rear door pins 22, 24 and the front and rear door latch rods 26, 28 are depicted. The arrows shown adjacent to the distal ends 38, 40 of the pins 22, 24, respectively, indicate the striking motion of the pins 22, 24 on the rods 26, 28, respectively, when actuated by the solenoid 20.

Referring again to FIG. 1*a*, the striking of the rear door latch rod 28 toggles the rear door lock latch assembly 32, moving it from an unlocked to a locked position or from a locked to unlocked position, depending on which position the latch assembly 32 was in prior to movement of the rear door latch rod 28. Those skilled in the art will recognize a variety of ways to accomplish this toggle within the latch assembly 32. The rear door lock latch assembly 32 is engagable with a rear door striker 36 mounted to a second vehicle pillar 37, commonly referred to as a C pillar. When locked, the rear door lock latch assembly 32 is engaged with the striker 36; when unlocked, the rear door lock latch assembly 32 is disengaged from the striker 36.

As illustrated in FIG. 1*a*, other mechanisms may act upon the front and rear door lock latch assemblies 30, 32 causing them to lock or unlock the doors 12, 14. For instance, the front door 12 includes a front door key lock 46 which is operatively connected to the front door lock latch assembly 30. Thus, the front door key lock 46 may be operated to lock and unlock the front door lock latch assembly 30. Additionally, the front door 12 and the rear door 14 include front and rear manual lock buttons 42, 44, respectively, which are mounted on the vehicle doors 12, 14 and connected to the front and rear door lock latch assemblies 30, 32, respectively. If an operator pulls upward on the buttons 42, 44, it will cause the latch assemblies 30, 32 to be disengaged from the strikers 34, 36, respectively. The design of the latch assemblies 30, 32 may include additional features such as an override on the rear door latch assembly 32 that prevents the rear manual lock button 44 from being used to disengage the striker 36 under certain conditions (e.g., during vehicle movement).

Figure 1C:
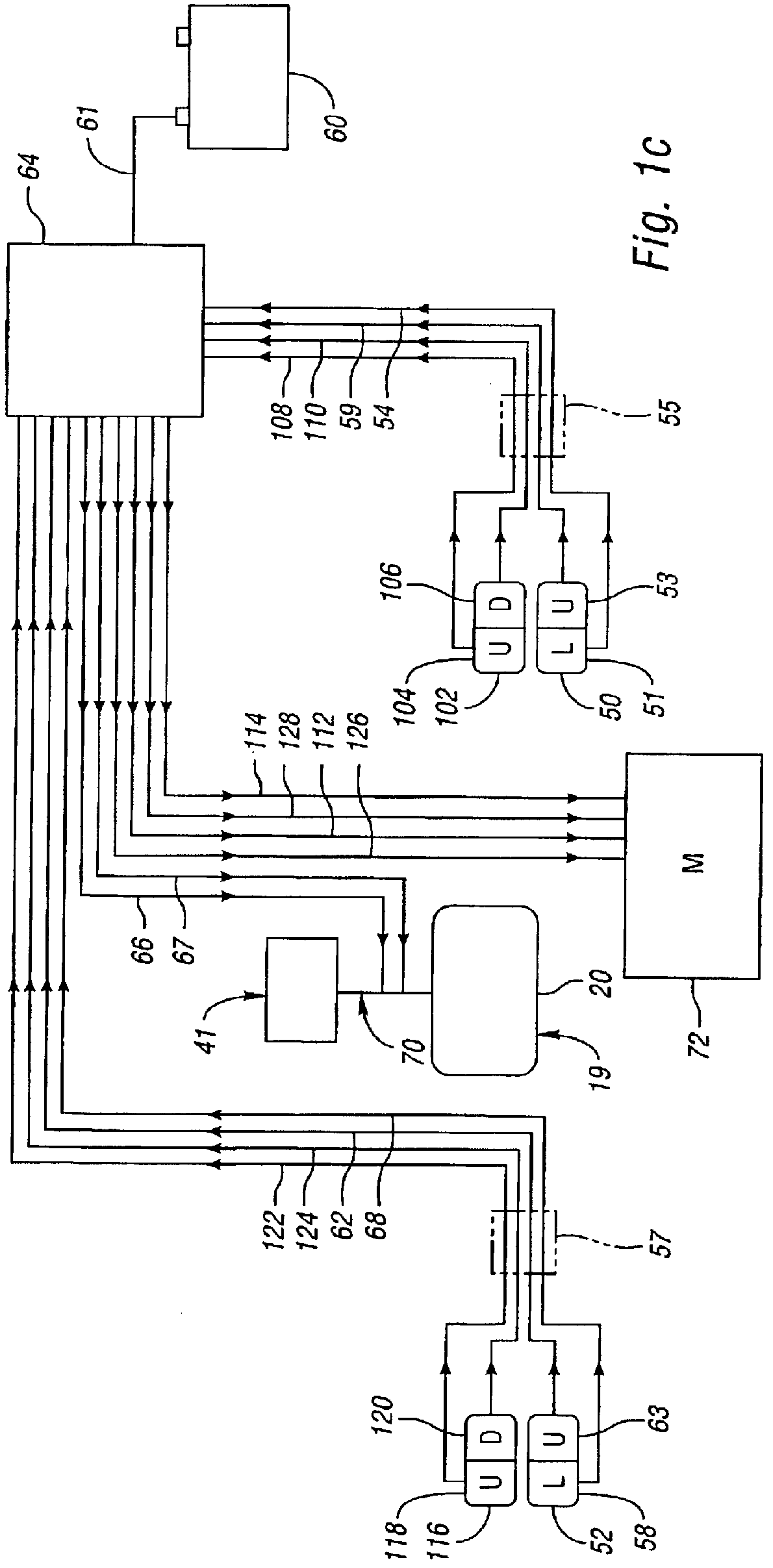
FIG. 1*c* is a schematic electrical wiring diagram depicting the power flow in the power door lock system and the power window system of FIG. 1*a;*

The solenoid 20 may be powered by operation of a front door operator lock pad 50 mounted to the front door 12 or a rear door operator lock pad 52 mounted to the rear door 14. The front door operator lock pad 50 includes a front door lock button 51 and a front door unlock button 53. As depicted in FIG. 1*c*, wherein like reference numbers refer to like components in FIG. 1*a*, operation of the front door lock button 51 causes a front door operator lock signal 54 to be directed from the lock pad 50, through a front door wire casing 55 to a power switch 64. A battery 60 is also operatively connected to the power switch 64. The front door operator unlock signal 54 completes a circuit in the power switch 64, allowing a battery power signal 61 from the battery 60 to send a solenoid front pin power signal 66 to the solenoid 20, thus powering the solenoid 20 and toggling the lock assembly 30, as discussed above with respect to FIG. 1*a*. The battery 60, the power switch 64 and the battery power signal 61 are also shown in FIG. 1*a*. The solenoid 20 may be designed such that the solenoid front pin power signal 66 also actuates the rear pin 24 (shown in FIGS. 1*a*–1*b*), thus giving the operator of the front door lock pad 50 control over the rear door latch assembly 32 (shown in FIG. 1*a*).

Similarly, operation of the front door unlock button 53 causes a front door operator unlock signal 59 to be directed from the lock pad 50, through the front door wire casing 55 to the switch 64. The front door operator lock signal 59 completes a circuit in the switch 64, allowing battery power 61 to send solenoid front pin power signal 66 to the solenoid 20, thus toggling the lock assembly 30 as discussed above with respect to FIG. 1*a*.

Referring to FIG. 1*a*, the rear door operator lock pad 52 includes rear door lock and unlock buttons 58, 63 and is similarly connected to the solenoid 20. Referring to FIG. 1*c*, operation of the rear door lock button 58 causes a rear door operator lock signal 62 to be directed from the lock pad 52, through a rear door wire casing 57 to the power switch 64. The rear door operator lock signal 62 completes a circuit in the power switch 64, allowing a battery power signal 61 from the battery 60 through to send a solenoid rear pin power signal 67 to the solenoid 20 thus toggling the lock assembly 32 as discussed above with respect to FIG. 1*a*.

Similarly, operation of the rear door unlock button 63 causes a rear door operator unlock signal 68 to be directed from the rear door operator lock pad 52, through the rear door wire casing 57 to the switch 64. The rear door operator unlock signal 68 completes a circuit in the switch 64, allowing battery power 61 to send solenoid rear pin power signal 67 to the solenoid 20, thus toggling the lock assembly 32 as discussed above with respect to FIG. 1*a*. Referring again to FIG. 1*a*, the signals 54, 59, discussed above with respect to FIG. 1*c*, may travel from the front door operator lock pad 50 to the switch 64 through the front door wire casing 55 and another vehicle pillar 56, commonly known as an A pillar. The signals 62, 68 discussed above with respect to FIG. 1*c* may travel from the rear door operator lock pad 52 to the switch 64 through the rear door wire casing 57 and the B pillar 10. The battery 60 and the battery power signal 61 discussed above with respect to FIG. 1*c* are also depicted in FIG. 1*a* and may be located anywhere on the vehicle 13.

Referring again to FIG. 1*a*, the solenoid 20 may also be actuated by a radio signal from a key fob transmitter 39. A radio signal from the key fob transmitter 39 is received by a receiver 41 housed in the B pillar. The receiver 41 is connected to the solenoid 20. Referring to FIG. 1*c*, the radio signal received in the receiver 41 is converted to a remote operator electrical signal 70 that is sent to the solenoid 20, thus powering the solenoid 20 and toggling the lock assemblies 30, 32, as discussed above. Those skilled in the art will readily understand the ability of a key fob transmitter to actuate a solenoid.

Vehicle Power Window System

A second actuating mechanism 72, also referred to as a single reversible electric motor or a motor, is also housed in the hollow of the vehicle support pillar 10. The motor 72 includes a motor shaft 74 having a front window drive member 76 and a rear window drive member 78 disposed thereon. The front window drive member 76 is engagable with a front window system functional part 80 in a vehicle power window system 82 when the front door 12 is positioned against the pillar 10 (i.e., closed). The rear door drive member 78 is engagable with a rear window system functional part 84 in a vehicle power window system 82' when the rear door 14 is positioned against the pillar 10 (i.e., closed). The front door drive member 76 and the rear door drive member 78 may be beveled drive gears and may be referred to as front window drive gear 76 and rear window drive gear 78. The motor shaft 74 is translatable in an axial direction relative to its rotation. Thus, as shown by the vertical arrow in FIG. 1*a*, the motor shaft 74 is translatable in a vertical direction. This may be accomplished by disposing a solenoid mechanism within the motor 72. Translation of the motor shaft 74 enables engagement of either the front window drive gear 76 with the front window system window functional part 80 or the rear window drive gear 78 with the rear window system functional part 84. The front window system functional part 80 and the rear window system functional part 84 may be beveled worm gears matable with the front and rear window drive gears 76, 78. The front window system functional part 80 may also be referred to as a front window worm gear or a front window driven gear. Similarly, the rear window system functional part 84 may be referred to as a rear window worm gear or a rear window driven gear. Power window systems 82 and 82' may be identical.

The front window worm gear 80 is connected to a control arm 85 disposed along a lower edge 86 of a front window 88 by a flexible cable 98. Rotation of the front window drive gear 76 causes rotation of the front window worm gear 80 which in turn causes the control arm 85 to be raised or lowered along a guide rail 90 by the cable 98. The rear window drive gear 78 is similarly engagable with the rear window worm gear 84. The worm gear 84 is operatively connected to a control arm 94 disposed along the lower edge 95 of a rear window 96 via a flexible cable 98. Engagement of the rear window drive gear 78 with the rear worm gear 84 causes rotation of the rear worm gear 84 which, in turn, causes the rear window 96 to be raised and lowered along a guide rail 100 by the flexible cable 98.

A window operator control pad 102 with a front window up button 104 and a front window down button 106 may be mounted to the front door 12. Similarly, the rear door 14 includes a rear window operator control pad 116 including a rear window up button 118 and a rear window down button 120. Referring to FIG. 1*c*, operation of either the front window up button 104 or the front window down button 106 will cause either the front window operator raise signal 108 or a front window operator lower signal 110 to run from the front window up button and the front window down button 104, 106, respectively, through the front door wire casing 55 to the power switch 64. An operator control raise or lower signal 108 or 110, respectively, completes a circuit in the power switch 64, allowing battery power 61 to send a front window lift signal 112 or front window lower signal 114, respectively, to the motor 72, thus powering the motor, causing the raising or lowering of the front window 88 shown in FIG. 1*a*, as described above.

Similarly, operation of either the rear window up button 118 or the rear window down button 120 causes a rear window operator raise signal 122 and a rear window operator lower signal 124 to run from the rear window up and down buttons 118, 120, respectively, through the rear door wire casing 57 to the power switch 64. The operator control raise or lower signal 122, 124, respectively, completes a circuit in the power switch 64 allowing battery power 61 to send a rear window lift signal 126 or a rear window lower signal 128 to the motor 72 thus powering the motor and causing the raising or lowering of the rear window 96 (shown in FIG. 1*a*), as discussed above. Referring to FIG. 1*a*, the motor shaft 74 will be disposed either upwards and engaged with the window driven gear 80 or downwards and engaged with the rear window driven gear 80, in accordance with which of the signals 108, 110, 118 or 120 energizes the motor 72. Additional operator control buttons may be added to the front window operator control pad 102 and the power switch 64 may be designed to permit a signal emanating from such buttons to control the raising and lowering of the rear window 96. Accordingly, an operator of the front window control pad may control the rear window 96.

Figure 2A:
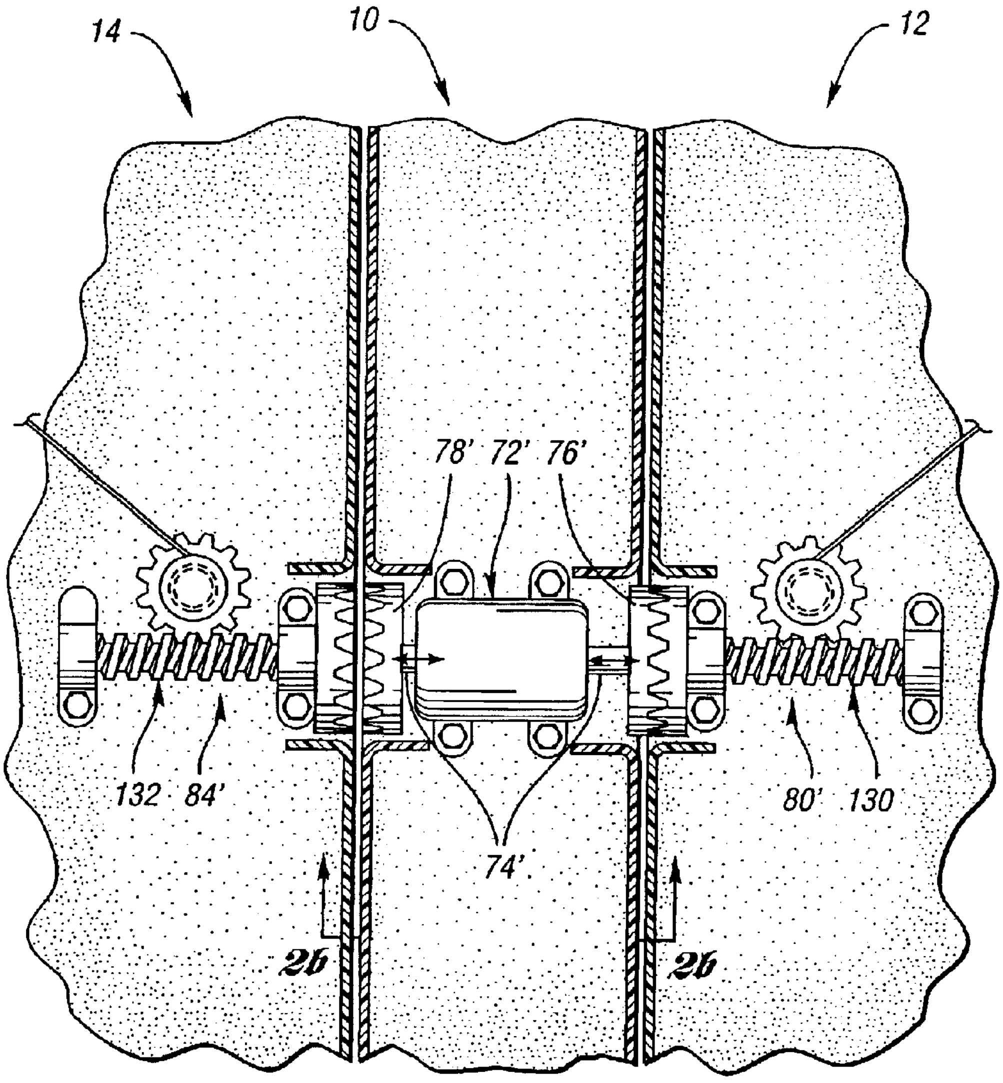
FIG. 2*a* is a fragmentary schematic illustration in partial view of a first alternative embodiment of the power window system of FIG. 1*a;*

In FIG. 1*a*, the motor 72 is vertically disposed (i.e., its shaft 74 runs parallel to the centerline 11 of the B pillar 10). Referring to FIG. 2*a*, wherein like reference numbers refer to like components in FIG. 1*a*, the invention contemplates that the motor may alternatively be horizontally disposed within the B pillar 10. As shown by the arrows in FIG. 2*a*, a horizontally disposed motor 72' includes a motor shaft 74' that is translatable in a horizontal manner. The horizontally disposed motor 72' would include a front window drive member 76' engagable with a front window system functional part 80' and a rear window drive member 78' engageable with a rear window system functional part 84'. The front and rear window system functional parts 80', 84' may be front and rear worm gears, as in the window system 82 depicted in FIG. 1*a*, and may be referred to as such. The front and rear window drive members 76', 78' and the worm gears 80', 84' may be designed with gear geometry, such as gears with engageable faces, as shown, allowing for engagement when front and rear shaft portions 130, 132 of the front and rear worm gears 80', 84', respectively, are aligned with the motor shaft 74'. In FIG. 2*a*, the motor shaft 74' is displaced towards the right, causing engagement of the front window drive member 76' and the front worm gear 80'. Alternatively, the shaft portions 130, 132 may be offset relative to the motor shaft 74', allowing for a beveled gear design, similar to that depicted in FIG. 1*a*.

Figure 2B:
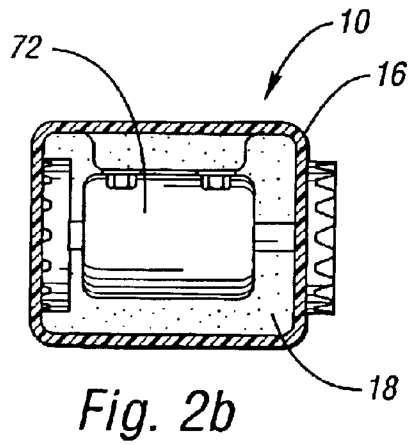
FIG. 2*b* is a schematic illustration in horizontal cross-sectional view of the power window system of FIG. 2*a;*

Referring to FIG. 2*b*, wherein like reference numbers refer to like components in FIG. 1*a*–2*a*, a cross sectional view of the B pillar 10 taken at the arrows shown in FIG. 2*a* is shown. The structural member 16 and the hollow support portion 18 are depicted.

Figure 3:
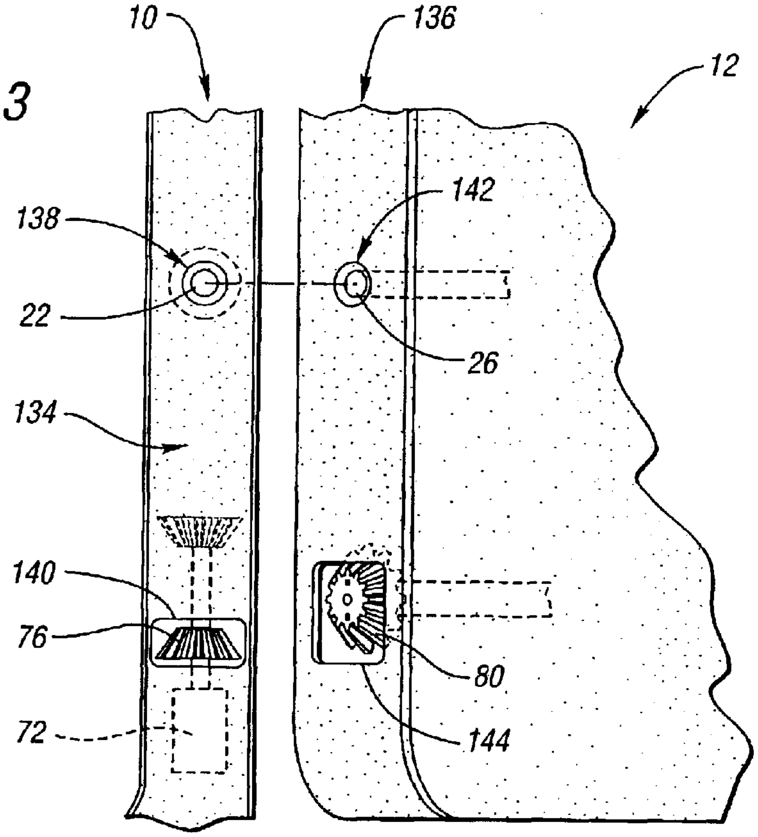
FIG. 3 is a fragmentary schematic illustration in side view of a B pillar and in perspective view of a partially open portion of a flanking vehicle door, both of which are depicted in the vehicle having a power door lock system and power window system shown in FIG. 1*a*.

FIG. 3, wherein like reference numbers refer to like components in FIGS. 1*a*–2*b*, depicts a section of the vehicle support pillar 10 having a face 134 that is disposed adjacent to a face 136 of the front vehicle door 12 when the front vehicle door 12 is closed. The vehicle support pillar 10 is formed with a front door pin hole 138 and a front door drive member hole 140. The face 136 of the front door 12 is formed with a front door latch hole 142 and a front window system functional part hole 144. The holes 138, 140, 142, 144 are disposed such that when the door 12 is closed, the front door pin hole 138 is aligned with the front door latch hole 142 and the front door, drive member hole 140 is aligned with the front window system functional part hole 144. The front door pin 22 and the front door latch rod 26 are sufficiently aligned with the holes 138, 142, respectively, such that the front door pin 22 is able to strike the front door latch rod 26 during powering of the solenoid 20 (shown in FIG. 1*a*) when the door 12 is closed. Similarly, the front window drive gear 76 and the front window worm gear 80 are sufficiently aligned with the holes 140, 144, respectively, such that the front window drive gear 76 is engagable with a front window worm gear 80 when the front door 12 is closed.

Figure 4:
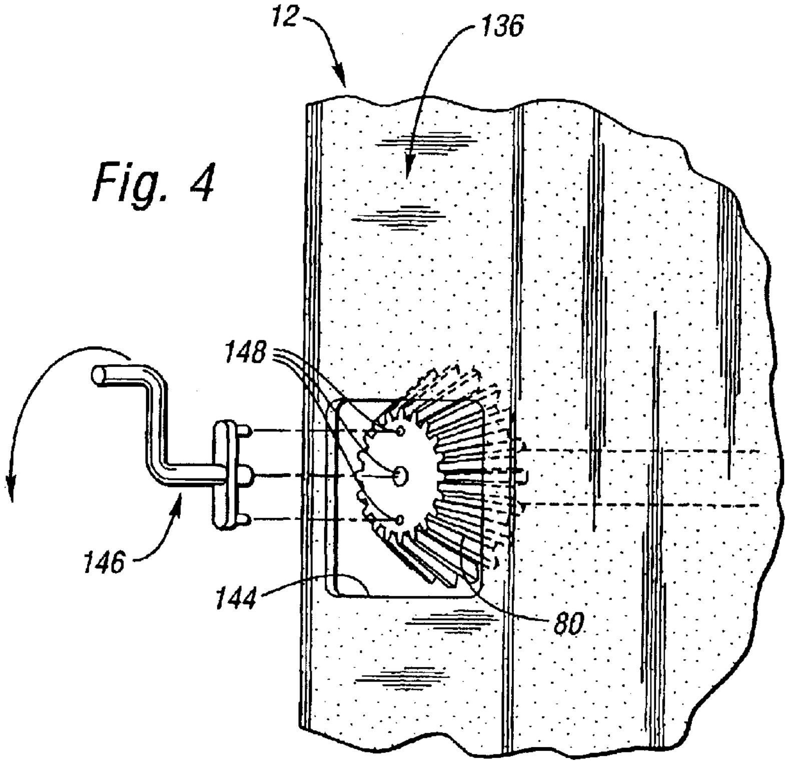
FIG. 4 is a schematic perspective illustration in partial view of a vehicle door having a front window driven gear and of a manual crank that is operably engageable with the driven gear.

Referring to FIG. 4, wherein like reference numbers refer to like components in FIGS. 1*a*–3, the front window system functional part 80 is visible through the front window system functional part hole 144 on the face 136 of the door 12. A manual crank 146 is shown that is operably engagable with ports 148 on the front door window system functional part 80. When engaged with the ports 148, the manual crank 146 may be used to turn the window system functional part 80 manually, for raising and lowering the front window 88 (shown in FIG. 1*a*). The rotational arrow in FIG. 4 depicts the circular cranking motion that would be employed to operate the manual crank 146. The crank 146 would be especially useful in case of an electrical power failure preventing operation of the motor 72.

Accordingly, referring again to FIG. 1*a*, the vehicle door lock system 25 and the vehicle window system 82 together are a vehicle power window and power door lock system 121 including the single lock actuation assembly 19 and the single reversible electric motor 72, both of which are mounted in the B pillar 10 disposed between the front door 12 and the rear door 14. With this disposition within the B pillar 10, the vehicle power window and power door lock system 121 allows for the powering of two windows 88, 96 via a single motor 72 and the powering of two door lock latch assemblies 30, 32 via a single solenoid 20. Additionally, a vehicle side door assembly 123 includes the door lock latch assembly 30, the front door latch rod 26, the front window 88 and the front window driven gear 80.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the invention with the scope of the appended claims.

What is claimed is:

1. A vehicle pillar adapted for use between openable and closable vehicle doors having functional parts therein and comprising:

a structural member defining a hollow vehicle support portion adapted to abut each vehicle door; and an actuating mechanism housed within the hollow vehicle support portion and including a drive member sufficiently engageable with a functional part of a respective vehicle door when the door is closed and the vehicle pillar is between the doors, so that the functional part functions.

2. The vehicle pillar of claim 1, wherein the actuating mechanism is actuatable by using a key fob.

3. The vehicle pillar of claim 1 in combination with a pair of flanking vehicle doors.

4. The vehicle pillar of claim 1, wherein the functional part is in a vehicle door lock system that locks and unlocks the doors.

5. The vehicle pillar of claim 1, wherein the functional part is in a vehicle window system that opens and closes windows.

6. A vehicle power window and power door lock system comprising:

a single lock actuation assembly adapted for engagement with a front door lock latch assembly on a front door and a rear door lock latch assembly on a rear door for locking and unlocking the doors; and a single reversible electric motor adapted for selective engagement with a front window on the front door and a rear window on the rear door for driving the windows up and down;

wherein the lock actuation assembly and the motor are mountable on a body pillar disposed between the front and rear doors.

7. The vehicle power window and power door lock system of claim 6, wherein the lock actuation assembly includes a dual action solenoid adapted for engagement with the front and rear door latch assemblies.

8. The vehicle power window and power door lock system of claim 6, wherein the lock actuation assembly is engageable with the front door lock latch assembly in the front door when the front door is closed and with the rear door lock latch assembly in the rear door when the rear door is closed.

9. The vehicle power window and power door lock system of claim 8 wherein the lock actuation assembly includes a front door engagement member and a rear door engagement member; and wherein the front and rear door engagement members are disposed in the body pillar in a manner allowing for operable connection of the members with the respective door latch assemblies.

10. The vehicle power window and power door lock system of claim 9, wherein the front and rear door engagement members each have a distal end, said distal ends being movable in substantially opposing directions away from the center of the body pillar for operable connection with the latch assemblies.

11. The vehicle power window and power door lock system of claim 10, wherein the movement of the distal ends is in a substantially horizontal direction.

12. The vehicle power window and power door lock system of claim 10 further including:

the front door latch assembly;

the rear door latch assembly;

a front door latch rod; and a rear door latch rod;

wherein the latch rods are operatively connected to the respective door latch assemblies on one end and operably connectable to the distal end of the respective engagement members on the other end when the engagement members are moved in the opposing directions.

13. The vehicle power window and power door lock system of claim 6, wherein the motor is selectively engageable with the front window when the front door is closed and with the rear window when the rear door is closed.

14. The vehicle power window and power door lock system of claim 13, further including:

a front window drive gear; and a rear window drive gear;

wherein the drive gears are driven by the motor and are disposed in the body pillar in a manner allowing for operable connection of the drive gears with the respective windows.

15. The vehicle power window and power door lock system of claim 14, wherein the motor is substantially disposed either vertically or horizontally in the body pillar.

16. The vehicle power window and power door lock system of claim 14, further including:

a front window driven gear; and a rear window driven gear;

wherein the driven gears are operatively connected to the respective windows and are disposed in the front door and in the rear door, respectively, in a manner allowing for operable connection of the driven gears with the drive gear when the doors are closed.

17. The vehicle power window and power door lock system of claim 16, wherein the motor is substantially disposed either vertically or horizontally in the body pillar.

18. The vehicle power window and power door lock system of claim 16, further including:

a manual crank, wherein the manual crank is operably connectable to at least one of the driven gears in at least one of the doors for manual movement of the respective window when said at least one of the doors is open.

19. A vehicle side door assembly adapted for movement relative to a body pillar, comprising:

a door lock latch assembly;

a latch rod operatively connected to the latch assembly;

a window; and a driven gear operatively connected to the window;

wherein the latch rod is operably connectable to a lock actuation assembly located in a body pillar when the door is positioned against the body pillar, and wherein the driven gear is operably connectable to a motor located in the body pillar when the door is positioned against the body pillar.

20. A vehicle power window and power door lock system comprising:

a single lock actuation assembly adapted for engagement with a front door lock latch assembly on a front door and a rear door lock latch assembly on a rear door for locking and unlocking the doors, including:

a front door engagement member;

a rear door engagement member;

a single reversible electric motor adapted for engagement with a front window on the front door and a rear window on the rear door for driving the windows;

a front window drive gear; and a rear window drive gear;

wherein the drive gears are driven by the motor, and wherein the lock actuation assembly and the motor are mountable on a body pillar disposed between the front and rear doors, the front and rear door engagement members are disposable in the body pillar in a manner allowing for operable connection of the members with the respective door latch assemblies, and the drive gears are disposable in the body pillar in a manner allowing for operable connection of the drive gears with the respective windows.

* * * * *